US008698784B2

(12) United States Patent
Lin

(10) Patent No.: US 8,698,784 B2
(45) Date of Patent: Apr. 15, 2014

(54) BUFFERED STYLUS

(75) Inventor: Wei-Hsin Lin, Taipei Hsien (TW)

(73) Assignee: Wistron Corporation (TW)

( * ) Notice: Subject to any disclaimer, the term of this patent is extended or adjusted under 35 U.S.C. 154(b) by 805 days.

(21) Appl. No.: 12/762,746

(22) Filed: Apr. 19, 2010

(65) Prior Publication Data

US 2010/0283767 A1 Nov. 11, 2010

(30) Foreign Application Priority Data

May 7, 2009 (TW) .............................. 98115117 A

(51) Int. Cl.
*G06F 3/033* (2013.01)

(52) U.S. Cl.
USPC .......................... 345/179; 401/258; 178/19.01

(58) Field of Classification Search
USPC ......... 345/179–183; 178/18.01, 19.01–20.04; 401/258–260; 341/5
See application file for complete search history.

(56) References Cited

U.S. PATENT DOCUMENTS

| | | | | |
|---|---|---|---|---|
| 3,378,330 A | * | 4/1968 | Schwartzman | 401/260 |
| 3,680,968 A | * | 8/1972 | Schwartzman et al. | 401/260 |
| 5,850,059 A | * | 12/1998 | Yoshimura | 178/19.01 |
| 6,707,451 B1 | * | 3/2004 | Nagaoka | 345/179 |
| 6,914,596 B2 | * | 7/2005 | Liu et al. | 345/179 |
| 7,511,706 B2 | * | 3/2009 | Schena | 345/179 |
| 2003/0067453 A1 | * | 4/2003 | Liu et al. | 345/179 |
| 2007/0075987 A1 | * | 4/2007 | Liu | 345/179 |
| 2007/0195069 A1 | * | 8/2007 | Kable et al. | 345/179 |
| 2008/0143693 A1 | * | 6/2008 | Schena | 345/179 |
| 2008/0225007 A1 | * | 9/2008 | Nakadaira et al. | 345/173 |

FOREIGN PATENT DOCUMENTS

| | | | | |
|---|---|---|---|---|
| JP | 03044725 A | * | 2/1991 | ............... G06F 3/03 |
| TW | M351404 | | 2/2009 | |

OTHER PUBLICATIONS

Official Action with abridged English Translation for China Patent Application No. 200910136756.8, dated May 18, 2011, 5 pages.

* cited by examiner

*Primary Examiner* — Lun-Yi Lao
*Assistant Examiner* — Priyank Shah
(74) *Attorney, Agent, or Firm* — Sheridan Ross P.C.

(57) ABSTRACT

A buffered stylus includes a barrel that has a first end and a second end opposite to the first end, and a staff that extends through the barrel. A front end portion of the staff has a part that extends outwardly of the first end of the barrel, and further has a rear end. A staff body portion is connected to the rear end of the front end portion, and has an elastically deformable segment capable of being extended and contracted in a longitudinal direction so as to absorb shock force. A rear end portion of the staff is connected to a rear end of the staff body portion, and is secured to the second end of the barrel.

8 Claims, 3 Drawing Sheets

BUFFERED STYLUS

CROSS-REFERENCE TO RELATED APPLICATION

This application claims priority of Taiwanese Application No. 098115117, filed on May 7, 2009.

BACKGROUND OF THE INVENTION

1. Field of the Invention

The present invention relates to a stylus, more particularly to a buffered stylus.

2. Description of the Related Art

As touch control technology develops, more and more 3C products now adopt the design of touch screen control. A touch control screen is generally used with a touch stylus. Because of frequent use and occasional excessive force applied to the screen, the screen can sometimes be scratched or damaged.

Referring to FIGS. 1 and 2, in order to absorb the shock force of a touch stylus, a conventional touch stylus 1 includes: a barrel 11; a front cap 12 that is connected to a front end of the barrel; a staff 13 that is disposed in the barrel 11 and that extends through the front cap 12; and a spring 14 that is sleeved on the staff 13, and that has opposite ends abutting against a shoulder 131 of the staff 13 and a shoulder 111 of the barrel 11, respectively. Therefore, as the tip of the staff 13 is pressed against a touch screen (not shown), the spring 14 is capable of reducing the shock force that the staff 13 applies to the screen.

Nevertheless, incorporating the spring 14 into the design not only increases the cost but also makes the entire structure more complex, which, in turn, increases the production time.

SUMMARY OF THE INVENTION

Therefore, an object of the present invention is to provide a buffered stylus that has a relatively simple structure and that can reduce production time.

Accordingly, the buffered stylus of the present invention comprises a barrel and a staff that extends through the barrel. The barrel has a first end and a second end that is opposite to the first end. The staff includes: a front end portion having a part that extends outwardly of the first end of the barrel and further having a rear end; a staff body portion that is connected to the rear end of the front end portion and that has a rear end; and a rear end portion that is connected to the rear end of the staff body portion and that is secured to the second end of the barrel. The staff body portion has an elastically deformable segment that is capable of being extended and contracted in a longitudinal direction so as to absorb shock force.

In one embodiment of the invention, the elastically deformable segment includes a plurality of ring elements, wherein adjacent ones of the ring elements are interconnected in such a manner that the ring elements are arranged in series along the longitudinal direction.

In another embodiment of the present invention, the elastically deformable segment is a wavy segment.

Preferably, the elastically deformable segment is connected to the rear end of the front end portion of the staff.

Preferably, the front end portion, the staff body portion, and the rear end portion of the staff are formed integrally.

In one embodiment of the invention, the front end portion of the staff includes: a guide section that is disposed in the barrel and that has a front end; a frustoconic section that is connected to the front end of the guide section, that has an outer diameter gradually reduced in a direction away from the guide section, and that has a front end; and a writing section that is connected to the front end of the frustoconic section and that extends outwardly of the first end of the barrel. The guide section has an outer diameter substantially equal to an inner diameter of the barrel such that movement of the front end portion along the longitudinal direction is guided by the guide section. Preferably, the first end of the barrel is formed with a gradually constricted portion, and the frustoconic section of the front end portion of the staff is received in the gradually constricted portion such that an axis of frustoconic section coincides with and does not deviate from an axis of the barrel.

In another embodiment of the present invention, the barrel includes a barrel body that has a front end, and a hollow front end cap that is connected to the front end of the barrel body. A front end of the front end cap defines the first end of the barrel. The front end portion of the staff extends outwardly of the front end cap and includes: a guide section that is received in the front end cap; a limiting section that is connected to a rear end of the guide section; a shoulder that is disposed between the guide section and the limiting section; and a writing section that is connected to a front end of the guide section and that extends outwardly of the front end of the front end cap. The guide section has an outer diameter substantially equal to an inner diameter of the front end cap such that movement of the front end portion along the longitudinal direction is guided by the guide section.

Preferably, the front end cap has a small outer diameter part, a large outer diameter part that is connected to a front end of the small outer diameter part and that has an outer diameter larger than that of the small outer diameter part, and a shoulder part that is disposed between the small outer diameter part and the large outer diameter part. The small outer diameter part is secured in the front end of the barrel body, and the shoulder section abuts against a front end face of the barrel body. More preferably, the shoulder of the front end portion of the staff abuts against a rear end face of the small outer diameter part of the front end cap.

Preferably, the rear end portion of the staff includes: a small outer diameter section that is secured in the second end of the barrel; a large outer diameter section that is connected to a rear end of the small outer diameter section and that has an outer diameter larger than that of the small outer diameter section; and a shoulder section that is disposed between the small outer diameter section and the large outer diameter section, and that abuts against an end face of the second end of the barrel.

By providing the staff body portion with the elastically deformable segment that is capable of being extended and contracted in a longitudinal direction so as to absorb shock force, when the tip of the staff is pressed against a touch screen, the elastically deformable segment functions as a buffer to reduce the shock force acting upon the screen.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 2:
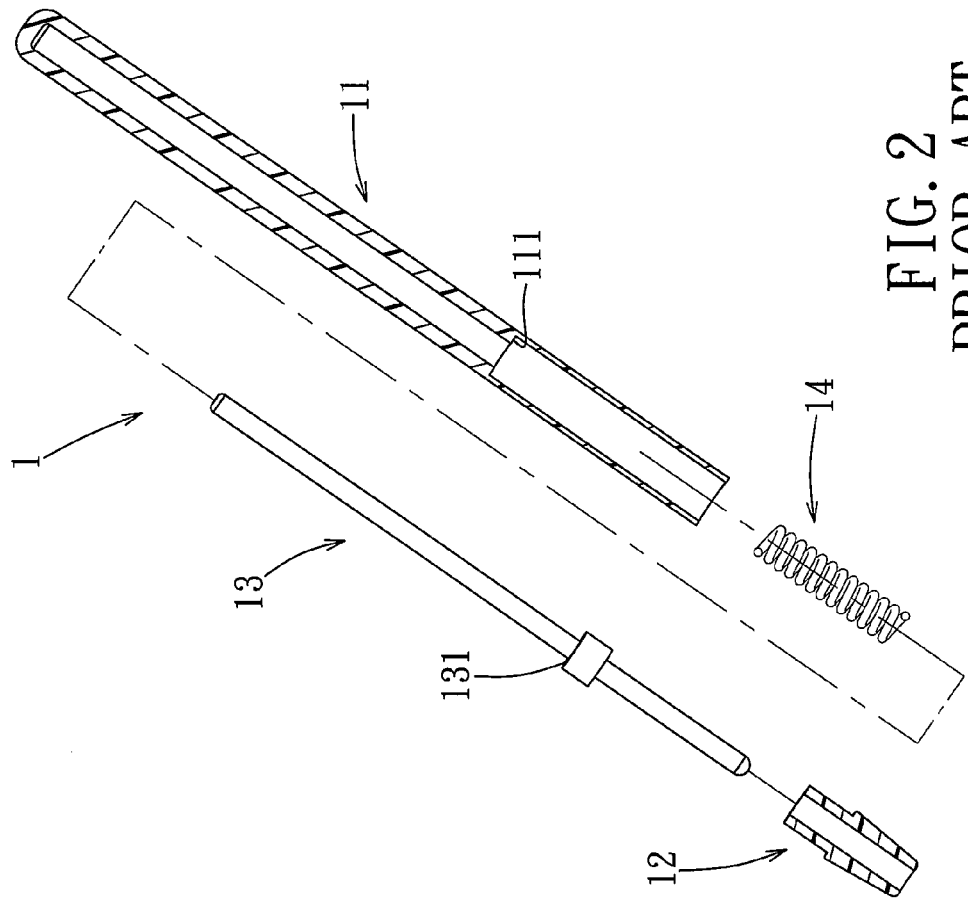
FIG. 2 is an exploded partly sectional view of the conventional buffered stylus.
Figure 1:
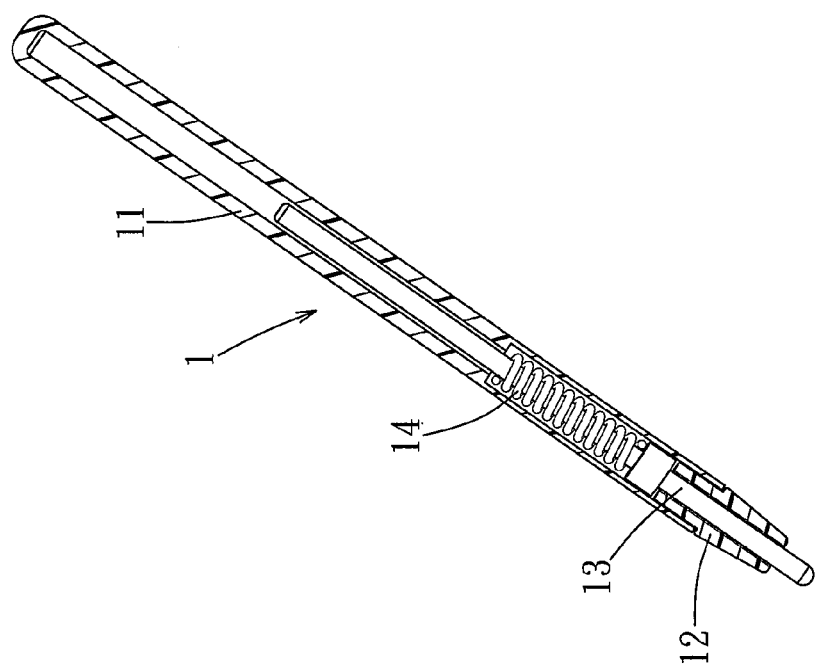
FIG. 1 is a schematic partly sectional view of a conventional buffered stylus.
Figure 4:
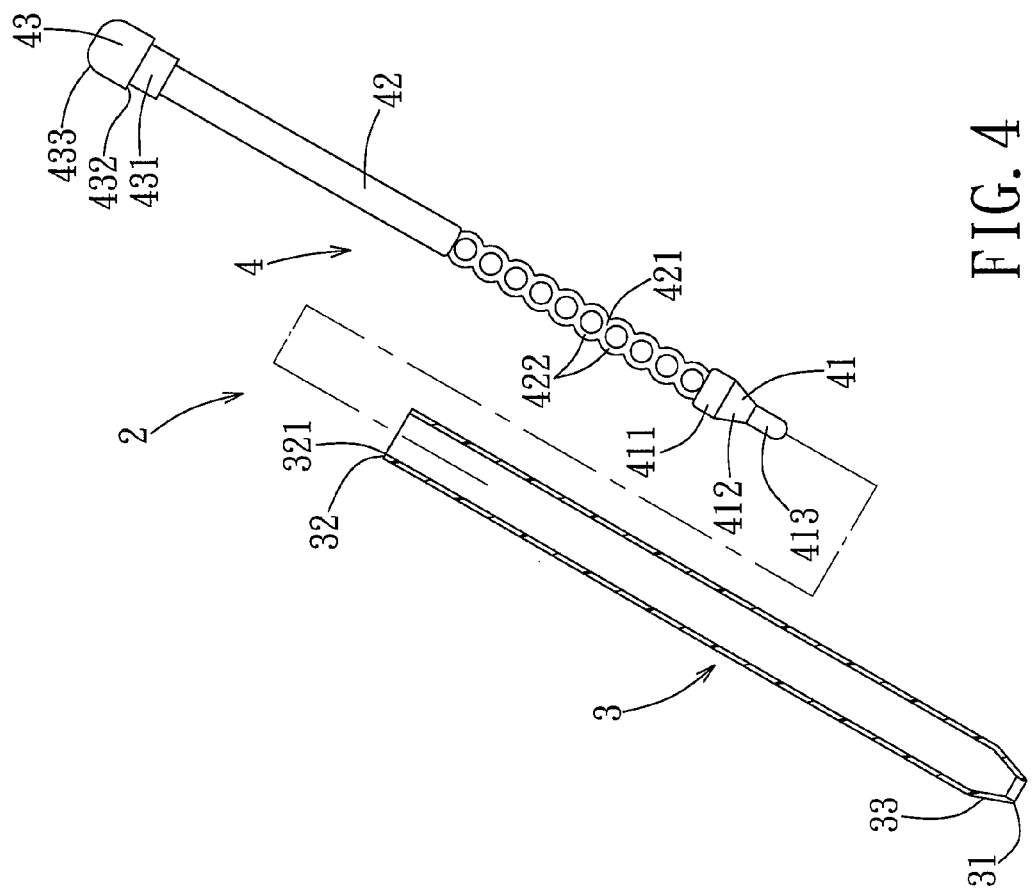
FIG. 4 is an exploded partly sectional view of the first preferred embodiment.
Figure 3:
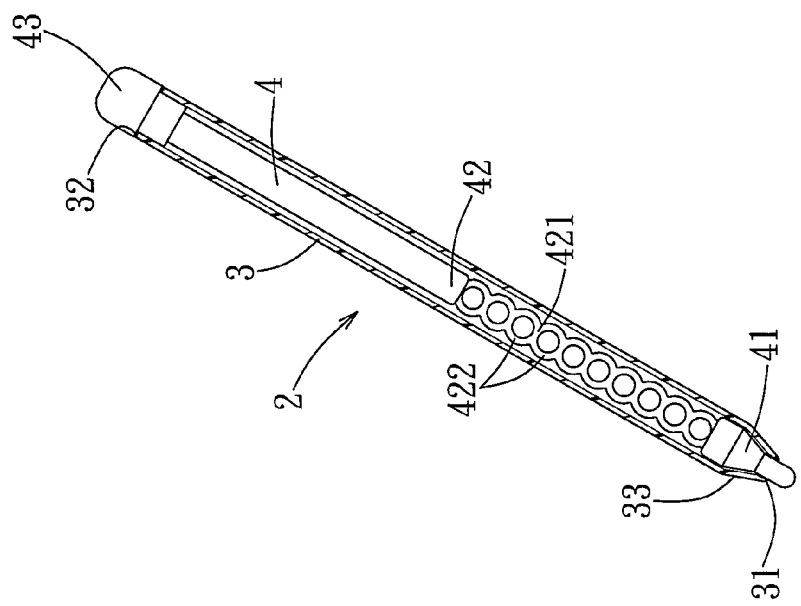
FIG. 3 is a schematic partly sectional view of the first preferred embodiment of a buffered stylus according to the present invention.

Referring to FIGS. 3 and 4, the first preferred embodiment of a buffered stylus 2 according to the present invention is shown to include a barrel 3 and a staff 4 that extends through the barrel 3.

The barrel 3 has a first end 31 and a second end 32 opposite to the first end 31. The first end 31 of the barrel 3 is formed with a gradually constricted portion 33.

The staff 4 includes: a front end portion 41 that has a part extending outwardly of the first end 31 of the barrel 3; a staff body portion 42 that is connected to a rear end of the front end portion 41; and a rear end portion 43 that is connected to a rear end of the staff body portion 42 and that is secured to the second end 32 of the barrel 3. The front end portion 41, the staff body portion 42, and the rear end portion 43 of the staff 4 are formed integrally.

The front end portion 41 includes: a guide section 411 that is disposed in the barrel 3; a frustoconic section 412 that is connected to a front end of the guide section 411 and that has an outer diameter gradually reduced in a direction away from the guide section 411; and a writing section 413 that is connected to a front end of the frustoconic section 412. The guide section 411 has an outer diameter that is substantially equal to an inner diameter of the barrel 3 such that movement of the front end portion 41 along a longitudinal direction is guided by the guide section 411. The frustoconic section 412 is received in the gradually constricted section 33 of the barrel 3. The writing section 413 extends outwardly of the first end 31 of the barrel 3, serves to touch a touch control screen (not shown), and has a round tip.

The staff body portion 42 has an elastically deformable segment 421 that is capable of being extended and contracted in the longitudinal direction so as to absorb shock force. The elastically deformable segment 421 is directly connected to the rear end of the front end portion 41 in this embodiment. In the present embodiment, the elastically deformable segment 421 includes a plurality of ring elements 422, adjacent ones of the ring elements 422 being interconnected in such a manner that the ring elements 422 are arranged in series along the longitudinal direction.

The rear end portion 43 includes: a small outer diameter section 431 that is connected to a rear end of the staff body portion 42; a large outer diameter section 433 that is connected to a rear end of the small outer diameter section 431 and that has an outer diameter larger than that of the small outer diameter section 431; and a shoulder section 432 that is disposed between the small outer diameter section 431 and the large outer diameter section 433. The small outer diameter section 431 is secured in the second end 32 of the barrel 3. The shoulder section 432 abuts against an end face 321 of the second end 32 of the barrel 30.

In the present embodiment, the staff 4 and the barrel 3 are secured to each other through fitting engagement between small outer diameter section 431 of the rear end portion 43 of the staff 4 and the second end 32 of the barrel 3. However, the staff 4 and barrel 3 may be secured to each other using other means, such as gluing or screwing together the small outer diameter section 431 of the rear end portion 43 of the staff 4 and the second end 32 of the barrel 3.

To assemble the buffered stylus 2, the staff 4 is inserted from the second end 32 of the barrel 3 so that the small outer diameter section 431 of the rear end portion 43 is secured in the second end 32 of the barrel 3, and that the shoulder section 432 abuts against the end face 321 of the second end 32.

In use, when the writing section 413 of the front end portion 41 of the staff 4 is pressed against the touch screen (not shown), the elastically deformable segment 421 is capable of being extended and contracted in the longitudinal direction so as to absorb shock force that the staff 4 applies to the screen. Furthermore, through the cooperation between the guide section 411 of the front end portion 41 and the barrel 3, the movement of the front end portion 41 along the longitudinal direction is guided to prevent deviation. Moreover, the cooperative design of the frustoconic section 412 of the front end portion 41 and the gradually constricted portion 33 of the barrel 3 can limit the forward movement of the front end portion 41, such that the staff 4 is held in the barrel 3 and that an axis of the frustoconic section 412 coincides with and does not deviate from an axis of the barrel 3.

Figure 6:
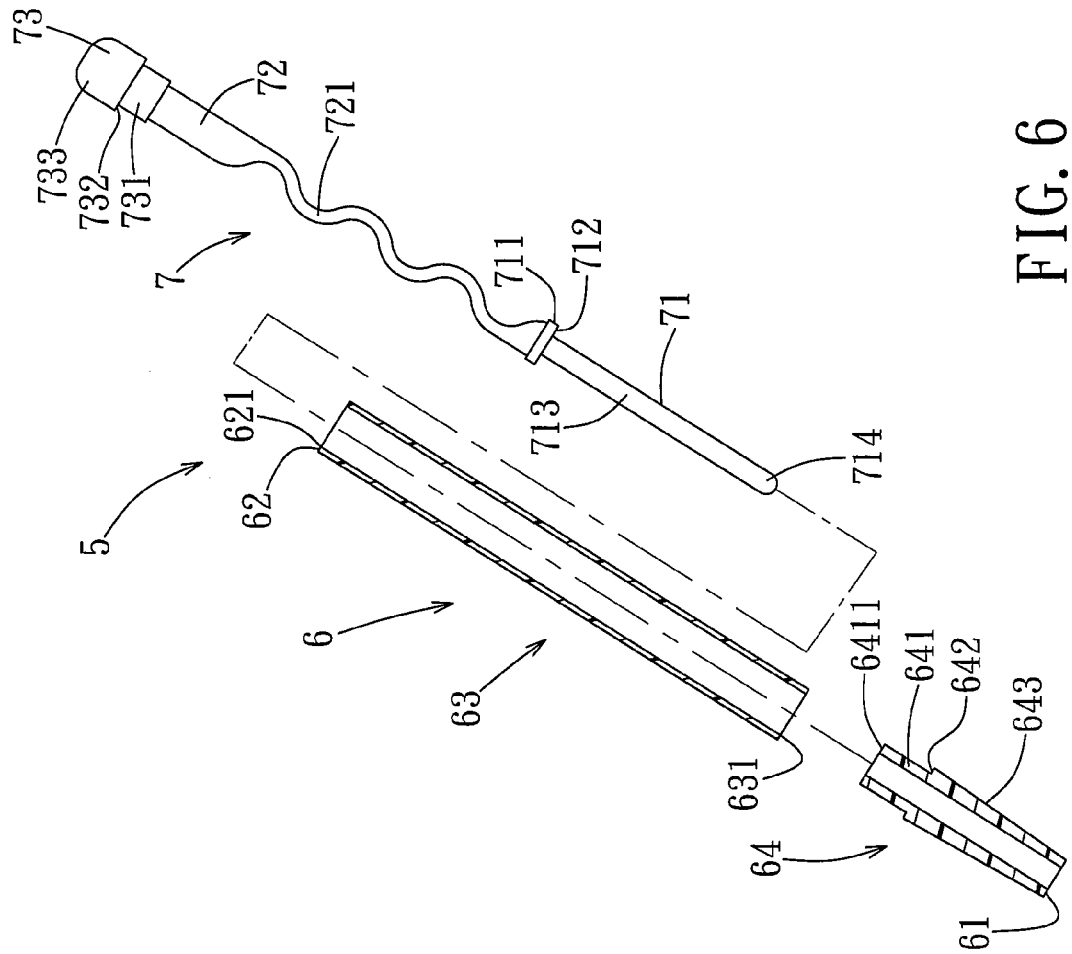
FIG. 6 is an exploded partly sectional view of the second preferred embodiment.
Figure 5:
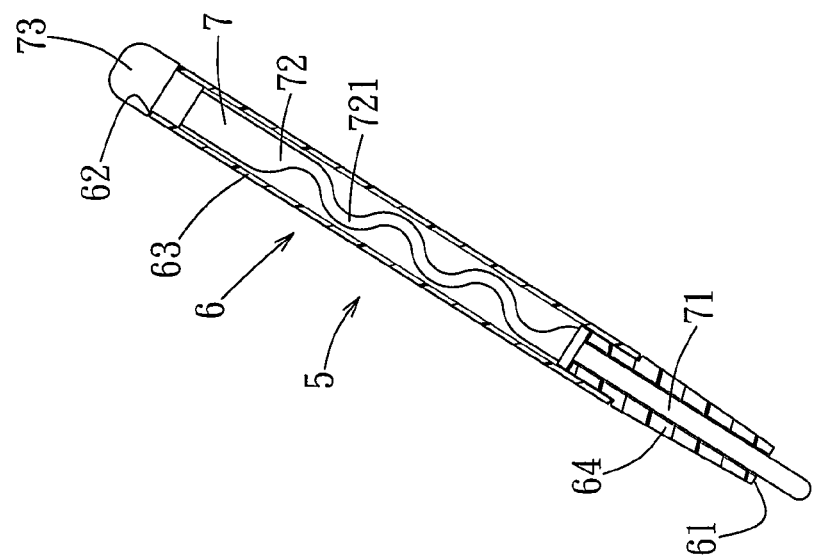
FIG. 5 is a schematic partly sectional view of the second preferred embodiment of a buffered stylus according to the present invention.

Referring to FIGS. 5 and 6, a buffered stylus 5 of the second preferred embodiment of the present invention includes a barrel 6 and a staff 7 that extends through the barrel 6.

The barrel 6 has a first end 61 and a second end 62 that is opposite to the first end 61. In the present embodiment, the barrel 6 includes a barrel body 63 and a front end cap 64 connected to a front end of the barrel body 63. The front end cap 64 has a front end that defines the first end 61 of the barrel 6, while the barrel body 63 defines has a rear end that the second end 62 of the barrel 6.

The front end cap 64 includes: a small outer diameter part 641 that is secured in the front end of the barrel body 63; a large outer diameter part 643 that is connected to a front end of the small outer diameter part 641 and that has an outer diameter larger than that of the small outer diameter part 641; and a shoulder part 642 that is disposed between the small outer diameter part 641 and the large outer diameter part 643, and that abuts against a front end face 631 of the barrel body 63.

In the present embodiment, the front end cap 64 and the barrel body 63 are secured to each other through fitting engagement between of the small outer diameter part 641 of the front end cap 64 and the front end of the barrel body 63. However, the front end cap 64 and the barrel body 63 may be secured to each other using other means, such as gluing or screwing together the small outer diameter part 641 of the front end cap 64 and the front end of the barrel body 63.

The staff 7 includes: a front end portion 71 that has a part extending outwardly of the first end 61 of the barrel 6; a staff body portion 72 that is connected to a rear end of the front end portion 71; and a rear end portion 73 that is connected to a rear end of the staff body portion 72 and that is secured to the second end 62 of the barrel 6. The front end portion 71, the staff body portion 72, and the rear end portion 73 of the staff 7 are formed integrally.

The front end portion 71 extends outwardly of the front end cap 64 and includes: a guide section 713 that is received in the front end cap 64; a limiting section 711 that is connected to a rear end of the guide section 713; a shoulder 712 that is disposed between the guide section 713 and the limiting section 711; and a writing section 714 that is connected to a front end of the guide section 713 and that extends outwardly of the front end of the front end cap 64. The guide section 713 has an outer diameter substantially equal to an inner diameter of the front end cap 64 such that movement of the front end portion 71 along a longitudinal direction is guided by the guide section 713. The shoulder 712 abuts against a rear end face 6411 of the small outer diameter part 641 of the front end cap 64. The writing section 714 is used to touch a touch control screen (not shown) and has a round tip.

The staff body portion 72 has an elastically deformable segment 721 capable of being extended and contracted in the longitudinal direction so as to absorb shock force. The elastically deformable segment 721 is directly connected to the rear end of the front end portion 71 in this embodiment. In the present embodiment, the elastically deformable segment 721 is a wavy segment.

The rear end portion 73 includes: a small outer diameter section 731 that is connected to the rear end of the staff body portion 72; a large outer diameter section 733 that is connected to a rear end of the small outer diameter section 731 and that has an outer diameter larger than that of the small outer diameter section 731; and a shoulder section 732 that is disposed between the small outer diameter section 731 and the large outer diameter section 733. The small outer diameter section 731 is secured in the second end 62 of the barrel 6. The shoulder section 732 abuts against an end face 621 of the second end 62 of the barrel 6.

In the present embodiment, the staff 7 and the barrel 63 are secured to each other through fitting engagement between the small outer diameter section 731 of the rear end portion 73 of the staff 7 and the second end 62 of the barrel 6. However, the staff 7 and the barrel 6 may be secured to each other using other means, such as gluing or screwing together the small outer diameter section 731 of the rear end portion 73 of the staff 7 and the second end 62 of the barrel 6.

To assemble the buffered stylus 5, the small outer diameter part 641 of the front end cap 64 is secured in the front end of the barrel body 63 such that the shoulder part 642 abuts against the front end face 631 of the barrel body 63. The staff 7 is inserted from the second end 62 of the barrel 6 so that the small outer diameter section 731 of the rear end portion 73 is secured in the second end 62 of the barrel 6, and that the shoulder section 732 abuts against the end face 621 of the second end 62.

In use, when the writing section 714 of the front end portion 71 of the staff 7 is pressed against a touch screen (not shown), the elastically deformable segment 721 is capable of being extended and contracted in the longitudinal direction so as to absorb shock force that the staff 7 applies to the screen. Furthermore, through the cooperation between the guide section 713 of the front end portion 71 and the front end cap 64, the movement of the front end portion 71 along the longitudinal direction is guided to prevent deviation. Moreover, the cooperative design of the shoulder 712 of the front end portion 71 and the rear end face 6411 of the front end cap 64 can limit the forward movement of the front end portion 71, so that the staff 7 is held in the barrel 6.

In sum, the staff body portions 42, 72 of the staffs 4, 7 have elastically deformable segments 421, 721 that are capable of being extended and contracted in a longitudinal direction such that the elastically deformable segments 421, 721 can absorb the shock force that the front end portions 41, 71 of the staffs 4, 7 apply to the touch control screen, respectively. Since the elastically deformable segments 421, 721 are formed integrally with the staff body portions 42, 72, the structures of the buffered stylus 2, 5 are simplified, thereby reducing production time.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A buffered stylus comprising:
    a barrel having a first end and a second end opposite to said first end; and
    a staff extending through said barrel, said staff having
    a front end portion having a part that extends outwardly of said first end of said barrel, said front end portion further having a rear end, and
    a staff body portion connected to said rear end of said front end portion, said staff body portion having an elastically deformable segment capable of being extended and contracted in a longitudinal direction so as to absorb shock force, said staff body portion further having a rear end, and
    a rear end portion connected to said rear end of said staff body portion, and secured to said second end of said barrel,
    wherein said front end portion, said staff body portion and said rear end portion of said staff are integrally formed as one piece,
    wherein said elastically deformable segment has at least one wavy structure extending in the longitudinal direction, and
    wherein said elastically deformable segment has two of said wavy structures that extend in the longitudinal direction, and that are coupled to configure as a plurality of ring elements arranged in series in the longitudinal direction.

2. The buffered stylus as claimed in claim 1, wherein said elastically deformable segment is connected to said rear end of said front end portion.

3. The buffered stylus as claimed in claim 1, wherein said front end portion of said staff includes
    a guide section that is disposed in said barrel and that has a front end, said guide section having an outer diameter substantially equal to an inner diameter of said barrel such that movement of said front end portion along the longitudinal direction is guided by said guide section,
    a frustoconic section that is connected to said front end of said guide section, that has an outer diameter that is gradually reduced in a direction away from said guide section, and that has a front end, and
    a writing section that is connected to said front end of said frustoconic section and that extends outwardly of said first end of said barrel.

4. The buffered stylus as claimed in claim 3, wherein said first end of said barrel is formed with a gradually constricted portion, and said frustoconic section of said front end portion of said staff is received in said gradually constricted portion.

5. The buffered stylus as claimed in claim 1, wherein:
    said barrel includes a barrel body having a front end, and a front end cap connected to said front end of said barrel body, said front end cap having a front end that defines said first end of said barrel body;
    said front end portion of said staff extending outwardly of said front end cap, and includes
    a guide section that is received in said front end cap and that has front and rear ends, said guide section having an outer diameter substantially equal to an inner diameter of said front end cap such that movement of said front end portion along the longitudinal direction is guided by said guide section, a limiting section that is connected to said rear end of said guide section, a shoulder that is disposed between said guide section and said limiting section, and a writing section that is connected to said front end of said guide section and that extends outwardly of said front end of said front end cap.

6. The buffered stylus as claimed in claim 5, wherein said barrel body has a front end face, and said front end cap includes a small outer diameter part that has a front end and that is secured in said front end of said barrel body, a large outer diameter part that is connected to said front end of said small outer diameter part and that has an outer diameter larger than that of said small outer diameter part, and a shoulder part that is disposed between said small outer diameter part and said large outer diameter part and that abuts against said front end face of said barrel body.

7. The buffered stylus as claimed in claim 6, wherein said small outer diameter part of said front end cap has a rear end face, and said shoulder of said front end portion of said staff abuts against said rear end face of said small outer diameter part of said front end cap.

8. The buffered stylus as claimed in claim 1, wherein said second end of said barrel has an end face, and said rear end portion of said staff includes a small outer diameter section that has a rear end and that is secured in said second end of said barrel, a large outer diameter section that is connected to said rear end of said small outer diameter section and that has an outer diameter larger than that of said small outer diameter section, and a shoulder section that is disposed between said small outer diameter section and said large outer diameter section, and that abuts against said end face of said second end of said barrel.

* * * * *